United States Patent Office 3,759,783
Patented Sept. 18, 1973

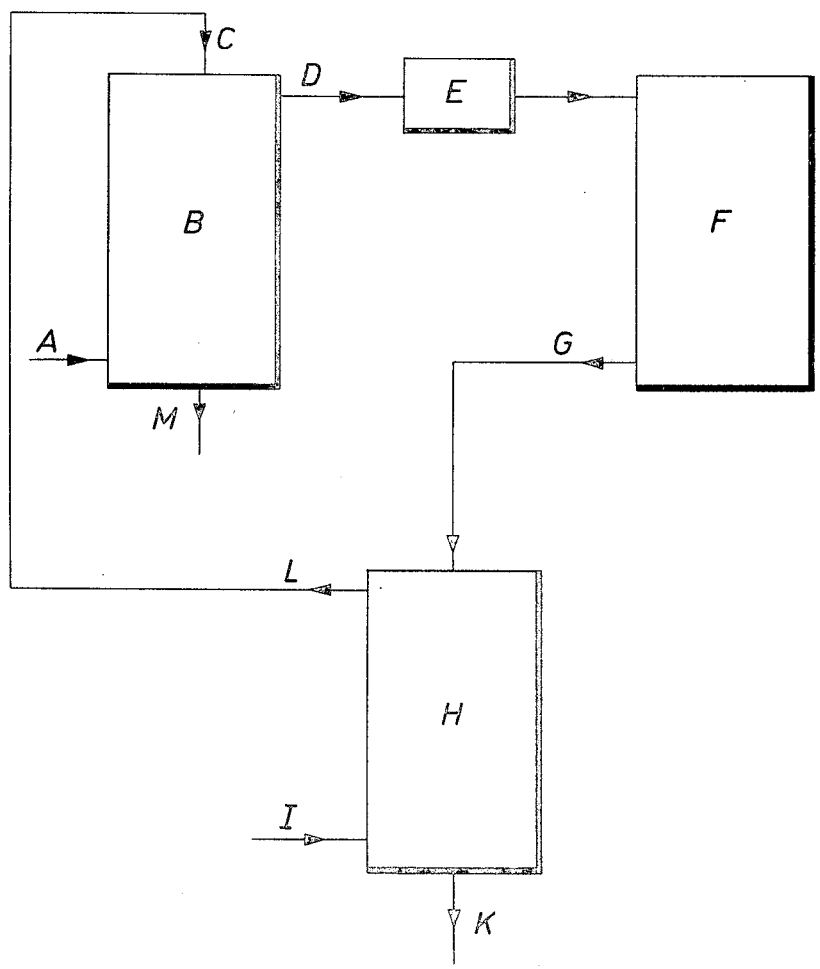

3,759,783
PROCESS FOR BLEACHING CELLULOSE PULP WITH ALKALI AND OXYGEN GAS UTILIZING WASTE BLEACHING LIQUOR FROM AN ALKALINE OXYGEN GAS BLEACHING STAGE
Hans Olof Samuelson, Goteborg, and Ingemar Liss-Albin Croon, Alfredshem, Sweden, assignors to Mo och Domsjo Aktiebolag, Ornskoldsvik, Sweden
Filed Aug. 23, 1971, Ser. No. 173,764
Claims priority, application Sweden, Aug. 25, 1970, 11,537/70
Int. Cl. D21c 9/10
U.S. Cl. 162—40    24 Claims

ABSTRACT OF THE DISCLOSURE

A process is provided for bleaching cellulose pulp with alkali in the presence of oxygen gas and particularly of air, in which the cellulose pulp is impregnated with spent pulping liquor and waste bleaching liquor from an alkaline oxygen gas bleaching stage.

---

Governmental regulations intended to prevent environmental pollution as well as economic factors have made it imperative for the cellulose pulp industry to cease dumping pulping wastes into lakes and streams, and either recycle or find some use for such waste products. Methods for recovering and recycling a major proportion of the organic substances present in spent cellulose pulping liquors derived from, for example, the kraft or sulfate process ("black" or sulfate spent liquor) and the sulfite process (sulfite spent liquor) have long been known to the art. The organic substances are used as fuel and the inorganic pulping chemicals are recovered from the ashes and recycled. Recovery of the substances present in spent cellulose pulping liquors is, however, quite expensive when a highly diluted liquor is obtained after separation of the pulp; such a liquor must be concentrated, if the chemicals are to be recovered in approximately 100% yields.

When the separation of the pulping liquor from the cellulose pulp has been completed (the liquor having been removed, for instance, for combustion purposes, or returned to the digester, or used in some other way), the cellulose pulp that is recovered is impregnated with diluted spent pulping liquor. If the pulp is to be bleached, this liquor has to be removed, to prevent the consumption of bleaching chemicals from reaching a prohibitive level, by reaction with the spent liquor components, so the pulp is normally subjected to an additional wash. The last washing is carried out during the screening of the pulp, in most cases. Incomplete removal of the spent pulping liquor by washing before the first bleaching stage during bleaching of the pulp (for example, before a chlorinating stage, a hypochlorite treatment stage or treatment with chlorine dioxide or chlorine together with chlorine dioxide) impairs the bleaching, and causes an increase in bleaching chemical consumption. The wash water from the last washing of the pulp contains appreciable amounts of organic and inorganic materials, and passes into the sewage system, possibly subsequent to having been passed through a sewage purification plant. Dumping of this water leads to serious water contamination problems, and necessitates expensive plants for rendering the substances from the waste pulping liquors harmless.

In accordance with the invention, it has been determined that when cellulose pulp is bleached by the alkali-oxygen gas process, that is, a bleaching process in which a gas containing oxygen is introduced into the system in the presence of alkali, which can be either sodium hydroxide and/or sodium carbonate and which optionally may contain sodium sulfide, bleaching can be effected with satisfactory results and often without increasing the consumption of alkali if the cellulose pulp contains both waste bleaching liquor from the alkali-oxygen gas bleaching process and spent pulping liquor. The waste alkali-oxygen gas bleaching liquor can be introduced into the pulp by using the liquor to wash part of the spent pulping liquor from the pulp, or by separating part of the spent pulping liquor from the pulp in some way, such as, for example, by pressing, or washing with water, and the waste bleaching liquor then added thereto. The remaining spent pulping liquor remains in the pulp during the alkali-oxygen gas bleaching stage. The waste alkali-oxygen gas bleaching liquor can be recycled within the pulp process, in a cyclic or continuous operation.

An unexpectedly advantageous result of this process is an improved delignfiication without an extra addition of alkali during the alkali-oxygen gas bleaching.

As the waste alkali-oxygen gas bleaching liquor, there can be used not only the alkaline liquor remaining in the bleaching system upon completion of the alkali-oxygen gas bleaching process, after separation of the pulp therefrom, but any aqueous solution which contains liquor from this bleaching process. For example, an aqueous solution obtained by washing out the contents of the bleaching system with, for instance, water or a mixture of water and liquid obtained from the bleaching process can be used. Solutions obtained in the washing system for the alkali-oxygen gas bleached pulp are also included in the term "waste alkali oxygen gas bleaching liquor," as used herein.

As the spent pulping liquor, there can be used not only spent cooking liquor from the sulfate or sulfite pulping processes, but also any aqueous solutions which contain a proportion of such spent cooking liquor.

Accordingly, the process of the present invention comprises a cyclic process (which may be carried out continuously or intermittently) for the alkali-oxygen gas bleaching of cellulose pulp in which the waste bleaching liquor separated from the bleached pulp at the conclusion of the bleaching process is recycled for reintroduction into the bleaching system, while a portion of the spent pulping liquor remaining in the cellulose pulp at the conclusion of the cellulose pulping process is removed before the bleaching is begun, preferably by pressing and/or displacement with waste alkali-oxygen gas bleaching liquor from the bleaching process. The cellulose pulp impregnated with the waste alkali-oxygen gas bleaching liquor and spent pulping liquor is then bleached by treatment with alkali in the presence of oxygen at a partial pressure of oxygen of at least about one bar or above and a temperature within the range from about 50° to about 140° C.

The process of the invention makes it possible to utilize economically and practically without loss the organic substances and inorganic residual chemicals present in the present in the spent cooking liquor that remains in the pulp during bleaching, while at the same time such chemicals in the waste alkali-oxygen gas bleaching liquor as are not recycled are combined with the spent cooking liquor, and can be recovered therewith, using known processes.

The figure shows schematically apparatus which as a complete bleaching system applies the process of the invention to cellulose pulp from either the sulfate or the sulfite pulping process.

The apparatus comprises a waste pulping liquor recovery plant B, a mixer E connected to the liquor recovery plant B via line D, an alkali-oxygen gas bleaching plant F connected to the mixer, a washing plant H connected to the bleaching plant F via line G, and recycle line I for conveying waste bleaching liquor from F via H to the liquor recovery plant B, into which it is introduced at C.

The operation of the bleaching system shown in the figure is as follows: Cellulose pulp from the digesters and containing spent cellulose pulping liquor is introduced at A into the liquor recovery plant B. The waste pulping liquor is partially washed out of the pulp here, using waste bleaching liquor from the alkali-oxygen gas bleaching stage F, which has been separated from the bleached pulp at the washing plant H, and is recycled to the liquor recovery plant B via line L to C. Alternatively, the major proportion of the spent cooking liquor can be removed from the digested pulp by pressing the pulp to, for example, a 40% pulp concentration, or the liquor can be removed in some other known manner.

The pulp still containing part of the spent pluping liquor impregnated now with waste alkali oxygen gas bleaching liquor leaves the liquor recovery plant B via line D and is passed to the mixer E where the bleaching chemicals are mixed therewith, including alkali, for instance sodium carbonate or sodium hydroxide, as well as other optional bleaching additives such as additional waste bleaching liquor, and protective substances such as complex magnesium compounds, which tend to inhibit deleterious degradation of the cellulose, and appreciable loss of hemicellulose to the bleaching liquor during the bleaching process. The impregnated pulp is then charged to the alkali-oxygen gas bleaching plant F, in which oxygen gas is introduced, and the bleaching carried out. The bleached pulp leaves the oxygen gas bleaching plant F via line G, where it is optionally washed with waste liquor from the alkali-oxygen gas bleaching, in known manner.

The bleached pulp, which may optionally be thinned with waste liquor, then passes to the washing plant H, where the waste liquor, containing both substances originating in the bleaching stage and substances originating in the pulping stage or digestion, is removed from the pulp by washing the pulp with water or an aqueous solution, preferably an aqueous solution which has previously been contaminated with organic substances. Suitable aqueous solutions which can be used are condensates from evaporation of spent pulping liquor or mixtures of spent pulping liquors and spent bleaching liquors from bleaching stages other than the alkali-oxygen gas bleaching stage.

The water or aqueous solution is introduced into the washing plant at I, and the washed alkali-oxygen gas bleached pulp leaves the washing plant at K.

The waste liquor separated from the pulp in the washing plant H is removed at L, and may be returned to the liquor recovery plant B at C.

At M of the liquor recovery plant there can be removed the waste liquor containing chemicals derived from spent pulping liquor separated in the washing of the pulp, and, if waste bleaching liquor is transferred to the liquor recovery plant, a certain amount of the chemicals in waste alkali-oxygen gas bleaching liquor.

The waste liquor mixture that is recovered at M can be processed using known methods for chemicals recovery of both black and sulfite waste liquor according to the waste pulping liquor used. Burning of the waste liquor removed at M can be effected subsequent to an evaporation process, for example, and wet combustion methods also can be applied, optionally without a preceding evaporation. The liquor can also be used to wash liquor from pulp in a stage other than the liquor recovery stage at plant B, preferably liquor in the digester or, in the case of continuous digestion, in a special zone of the digester.

If a part of the pulping liquor from the digestion stage has been removed from the pulp before the pulp enters the liquor recovery plant B, all or part of the waste liquor from B can be recirculated to the digestion or cooking stage. This is particularly suitable in alkaline pulping processes, such as sulfate cooking, soda cooking and alkali-oxygen gas pulping processes using, for example, sodium carbonate and/or sodium bicarbonate and/or sodium hydroxide, as well as in neutral sulfate cooking processes. With cooking processes such as these, large quantities of waste pulping liquor can be returned to the pulping stage, which improves total economy with regard to the reutilization of the pulping chemicals.

In the case of acid sulfite cooking processes, excessive spent waste sulfite liquor feedback to the digestion of liquor from the recovery plant B results in impaired lignin dissolution, and a decrease in the stability of the cooking acid. Consequently, in this case the waste liquor should be returned to the digesters from plant B in moderate quantities adapted to the cooking conditions used during the cooking process.

Alternatively, a part of the waste liquor removed from the waste liquor recovery plant B can be combined with waste liquor removed from the washing plant H and combusted, using wet combustion, or evaporated, and then subjected to combustion.

The waste liquor removed from the washing plant also can be combusted in a separate system, or used for some other useful purpose, for example, as part of the cooking liquor used in sulfate cooking processes.

The plants B and H can be of conventional design. If more than one filter or filter screen is used, the filters or screens should be connected in countercurrent sequence, so that the pulp is successively treated with a liquid having a decreasing solids content. Diffusers and/or washing columns for continuous or intermittent or batchwise operation can be included, as also can presses and other known means for washing, displacing and pressing waste liquor from pulp, or for separating waste liquor and other aqueous solutions from pulp.

In the case of a continuous digestion process, a washing zone included in the digester can also form a part of the waste liquor recovery plant. Waste liquor removed at L of the washing plant, for example, can be introduced at some point in the washing zone of the digester. In the case of batchwise cooking processes, the digester may even form a part of the recovery plant B. In this case, at least some of the spent cooking liquor is displaced from the pulp with waste liquor removed at L. It is expedient to arrange a buffer container between the washing plant H and the digester. If the washing plant and the alkali-oxygen gas bleaching processes are operated continuously, and pulping or digestion is effected intermittently, that is, batchwise, it is particularly suitable that sufficient buffer capacity be provided in the system.

The pulp delivered to the waste liquor recovery plant can be screened, in which case screening should be effected while the pulp is slurried in a waste liquor in accordance with the invention, preferably subsequent to removing the main portion of the pulping liquor, for example by pressing, and thinning the pulp with a solution containing waste liquor according to the invention. A filter stage can also be included in the waste liquor recovery plant B, or arranged between the plant B and the alkali-oxygen gas bleaching plant F, so that the pulp can be thinned by charging diluted waste liquor thereto, in accordance with the invention. A filter stage can also be included in the waste liquor recovery plant B, or arranged between the plant B and the alkali-oxygen gas bleaching plant F, so that the pulp can be thinned by charging diluted waste liquor thereto, in accordance with the invention. It has been noted, however, that filtering losses are substantially reduced if the filtering is not carried out until after the alkali-oxygen gas bleaching stage. In accordance with the preferred process, therefore, unfiltered or unscreened cellulose pulp is bleached with alkali in the presence of oxygen.

In certain types of waste liquor recovery plants, such as those containing rotary filters, for example, large fiber knots are likely to cause interruption in the operation of the plant. Consequently, it is suitable that the cellulose pulp (containing pulping liquor) be passed through known knot-removing means before being charged to the recovery plant B, or before being charged to the alkali oxygen gas bleaching plant F.

The process of the invention can be used to advantage with wood pulp of any type, but particularly to chemical pulp and semichemical pulp. The chemical pulp can be prepared by any pulping process. Sulate pulp and sulfite pulp are illustrative. The invention is applicable to cellulose pulps derived from any type of wood, such as spruce pulp, pine pulp, hemlock pulp, birch pulp, cherry pulp, sycamore pulp, hickory pulp, ash pulp, beech pulp, poplar pulp, oak pulp, and chestnut pulp.

In the case of semichemical pulp, such as for example, neutral sulfite pulp, it is sometimes desirable to mechanically disintegrate the pulp, such as in a refiner, before the pulp is fed to the waste liquor recovery plant B. This disintegration can be effected in the presence of waste liquor, which contains spent pulping liquor and/or diluted waste alkali-oxygen gas bleaching liquor.

It has also been found suitable to apply the process of the invention in conventional chemical cooking processes under milder cooking conditions than those generally applied, so that a pulp having a high shives content is obtained. This pulp is then passed to the waste liquor recovery plant B, with or without having been subjected to mechanical treatment. Thus, by applying this method it is possible to reduce the alkali charge in the sulfate cooking process, and/or lower the temperature and/or the cooking time, and in this way produce a shives-containing pulp of higher yield than is normal. This pulp is then passed to the waste liquor recovery plant B. After this pulp has been subjected to the alkali oxygen gas bleaching process of the invention, a semibleached pulp of low shives content is obtained, and this, after continued bleaching using conventional bleaching sequences such as, for example, a chlorine dioxide treatment, alkali extraction, and an acid-chlorine dioxide treatment, provides a low shives content pulp and a brightness corresponding to 90%, according to SCAN, with a wood consumption which is from 5% to 8% lower than that obtained with conventional sulfate cooking and bleaching processes. In the case of pulp having a high shives content, it may also be expedient to include in the bleaching sequence a chlorinating stage with a following extraction step, or to use in the bleaching sequence a mixture of chlorine and chlorine dioxide in the first stage after the alkali-oxygen gas bleaching stage.

The recovery of the organic substances, for example, the lignin and various carbohydrate degradation products, as well as the inorganic chemicals from the cooking, pulping and the bleaching stages, is progressively simplified and made progressively more effective with increasing amounts of waste alkali-oxygen gas bleaching liquor present when the pulp is fed to the bleaching stage. Removal of the spent digestion liquor remaining in the pulp subsequent to the cooking stage by pressing alone leads to good delignification during the alkali-oxygen gas treatment, provided that the pressing has removed 50% or more of the waste liquor present.

Only partial removal of the waste puping liquor by washing with recycled waste alkali-oxygen gas bleaching liquor gives in general a better bleaching, and, surprisingly, under suitable conditions, frequently may give a considerably better bleaching than alkali-oxygen gas bleaching of pulp which has been completely freed from spent pulping liquor. Thus, the presence of spent pulping liquor with the waste alkali-oxygen gas bleaching liquor can be quite advantageous.

The amounts of waste alkali-oxygen gas bleaching liquor and of spent pulping liquor that can be present during the alkali-oxygen gas bleaching of the invention are calculated in terms of organic substances therein.

The amounts of organic substance by weight of the total quantity of solids are determined as evaporation residue, according to TAPPI, minus the quantity of sodium calculated as $Na_2O$. The amount of such substances per 100 kg. of dry unbleached pulp is within the range from about 1 to about 50 kg.

For optimum results, when applying the bleaching process of the invention to sulfate pulp or soda pulp, the amount of organic substances derived from the original spent cooking liquor and present during the bleaching preferably is within the range from about 1 to about 35 kg., suitably from about 3 to about 20 kg., and still more preferably from about 5 to about 15 kg., per 100 kg. of dry unbleached pulp.

When the bleaching process of the invention is applied to alkali-oxygen gas digested pulp, the amount of organic substances can be somewhat higher, and preferably quantities of up to 50 kg. per 100 kg. of dry unbleached pulp are used for optimum results.

When the process of the invention is applied to sulfite pulp, the preferred upper limit with regard to the amount of organic substances is somewhat lower, and is approximately 30 kg. per 100 kg. of dry unbleached pulp.

The consumption of alkali increases markedly if the content of organic substance exceeds these limits, and moreover, the degree of delignification during the alkali-oxygen gas bleaching is impaired.

In many cases, it may be useful to preoxidize the spent digestion or cooking liquor before the liquor enters the oxygen gas bleaching stage. This preoxidizing process many suitably be effected with a gas which contains oxygen, such as oxygen gas or air, suitably while under pressure. The peroxidation can also be effected with oxidizing agents, such as, for example, peroxides, suitably in combination with oxygen-containing gas. In accordance with one embodiment of the invention, part of the non-oxidized spent cooking liquor is displaced from the pulp with oxidized spent cooking liquor, or preferably a mixture of oxidized spent cooking liquor and waste alkali-oxygen gas bleaching liquor, after which the resulting liquid remaining in the pulp is partially displaced therefrom with waste alkali-oxygen gas bleaching liquor. Oxidation of the spent cooking liquor is carried out on spent liquor which has been separated from the cellulose pulp, for example by means of filters or presses located in the waste liquor recovery plant B. The oxidized spent cooking liquor is then used for washing purposes and for displacement purposes in the recovery plant B, and is removed only partially from the cellulose pulp when the pulp is passed to the alkali-oxygen gas bleaching stage. The reason for preoxidizing the spent cooking liquor is to reduce the oxygen demand of this material during the alkali-oxygen gas bleaching process. However, the preoxidation is not a necessary step, because the consumption of oxygen gas by the spent cooking liquor is surprisingly small, even when quite large quantities of the nonoxidized spent cooking liquor are present during the alkali-oxygen gas bleaching.

In accordance with a particularly preferred embodiment of the invention, waste alkaline bleaching liquor is recovered from the alkali-oxygen gas bleaching stage under pressure, so that the liquor contains significant quantities of dissolved oxygen gas. This waste bleaching liquor is then used to wash and to partially displace spent cooking liquor from the pulp in displacement equipment operating at superatmospheric pressures. Because of the superatmospheric pressure maintained, the oxygen gas dissolved in the bleaching liquor does not escape, but is present for oxidation purposes in the displacement apparatus, so that the amount of oxygen gas consumed in the alkali-oxygen gas bleaching process can be further reduced.

In addition to any residual spent pulping liquor, the bleaching liquid in the alkali-oxygen gas bleaching stage also contains waste alkali-oxygen gas bleaching liquor. The amount of the waste alkali-oxygen gas bleaching liquor that is used is determined by the amounts of alkali introduced during the bleaching stage and the amount of organic substances that are to be recovered, and the amount of discharge of waste alkali-oxygen gas bleaching liquor that can be tolerated under the environmental pollution regulations, as well as the construction of the washing plant H, that is, the number of washing stages included therein.

It is often suitable to add enough waste liquor from the alkali-oxygen gas bleaching stage to replenish the alkali lost in the pulping process. If washing of the pulp and the recovery of waste bleaching liquor is carried out effectively in the bleaching system, it is possible when practicing the process of the invention to obtain a surplus of alkali, that is, more alkali than is required to replenish the pulping alkali. In this case, sodium carbonate and/or sodium bicarbonate, for example, can be recovered in known manner from the spent pulping liquor and/or from the waste alkali-oxygen gas bleaching liquor by combustion, optionally followed by leaching or crystallization stages. The sodium carbonate or bicarbonate can be returned to the alkali-oxygen gas bleaching stage, optionally subsequent to being causticized.

In the case when recovery of alkali during the alkali-oxygen gas bleaching of sulfate pulp is extensive, and the alkali from the alkali-oxygen gas bleaching process is used in the preparation of digestion or pulping liquor, in accordance with the invention, a progressive reduction in sulfidity is obtained which can be counteracted by supplying to the pulping system sulfur or sulfur compounds, such as sulfuric acid or sodium sulfate, for example, obtained from the recovery of tall oil, or residual acid from the manufacture of chlorine dioxide, or sulfuric acid, for example from chlorine gas drying processes, optionally subsequent to previously stripping or expelling chlorine and/or chlorine compounds.

During the alkali-oxygen gas bleaching process, the carbohydrates of the pulp may be subjected to a considerable attack, leading to degradation of the cellulose during processing, a diminution of pulp viscosity, and related effects. This may be advantageous in the manufacture of viscose pulps, for example. However, when paper pulps are being manufactured, especially when it is desired that these pulps retain a high mechanical strength, a protective compound can be added to the pulp so as to obtain a uniform controlled degradation and a controlled viscosity. For this purpose, complex magnesium compounds can be used.

The complex magnesium salts employed in the process of the invention have the important property of reducing or entirely preventing the attack of oxygen on the carbohydrates present in the cellulose and hemicellulose, without to any notably great extent affecting the oxidation of lignin and its dissolution. This protective effect is most noticeable with regard to the attack of oxygen on the cellulose molecule, and primarily the attack of oxygen along the anhydroglucose chain of the cellulose molecule, an attack which gives rise to a rapid lowering of pulp viscosity. Thus, in the presence of the complex magnesium compounds of the invention, the treated delignified pulp is found to have a higher viscosity than would be obtained in their absence.

It is known that aliphatic alpha-hydroxycarboxylic acids of the type RCHOHCOOH and the corresponding beta-hydroxycarboxylic acid RCHOHCH₂COOH have the property of forming chelates with metals. These chelates are of the type:

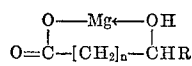

In the above formula, $n$ is zero or one. When $n$ is zero the acid is an alpha-hydroxy acid, and when $n$ is one, the acid is a beta-hydroxy acid.

R in the above formula is hydrogen or an aliphatic radical, which may be a hydrocarbon radical having from one to about ten carbon atoms, or a hydroxy-substituted hydrocarbon radical having from one to nine hydroxyl groups, and from one to about ten carbon atoms.

Exemplary alpha- and beta-hydroxy carboxylic acids are glycolic acid, lactic acid, glyceric acid, α,β-dihydroxybutyric acid, α-hydroxy-butyric acid, α-hydroxy-isobutyric acid, ribonic acid, xylonic acid, lyxonic acid, gulonic acid, β-hydroxy-butyric acid, β-hydroxy-isobutyric acid, β-hydroxy-n-valeric acid, β-hydroxy-isovaleric acid, erythronic acid, threonic acid, trihydroxy-isobutyric acid, and saccharinic acids and aldonic acids, such as gluconic acid, galactonic acid, talonic acid, mannonic acid, arabonic acid, ribonic acid, xylonic acid, lyxonic acid, gulonic acid, idonic acid, adtronic acid, allonic acid, ethenyl glycolic acid, and β-hydroxy-isocrotonic acid.

Also useful are organic acids having two or more carboxylic groups, and no or from one to ten hydroxyl groups, such as oxalic acid, malonic acid, tartaric acid, malic acid, and citric acid, ethyl malonic acid, succinic acid, isosuccinic acid, glutaric acid, adipic acid, suberic acid, azelaic acid, maleic acid, fumaric acid, glutaconic acid, citramalic acid, trihydroxy glutaric acid, tetrahydroxy adipic acid, dihydroxy maleic acid, mucic acid, mannosaccharic acid, ido-saccharic acid, talomucic acid, tricarballylic acid, aconitic acid, and dihydroxy tartaric acid.

The complex magnesium aminopolycarboxylic acid salts in accordance with the invention are formed from aminopolycarboxylic acids having the formula:

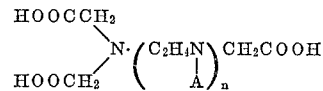

or alkali metal sals thereof, in which A is the group —CH₂COOH or —CH₂CH₂OH, where $n$ is an integer from zero to five. The mono, di, tri, tetra, penta and higher alkali metal salts are useful, according to the number of acid groups available and converted to alkali metal salt form.

Examples of such aminopolycarboxylic acids are ethylenediaminetetraacetic acid, nitrilotriacetic acid, diethylenetriaminopentaacetic acid, ethylenediaminetriacetic acid, tetraethylenepentaamineheptaacetic acid, and hydroxyethyl ethylenediamine triacetic acid, and their alkali metal salts, including the mono, di, tri, tetra and penta sodium, potassium and lithium salts thereof. Other types of aminocarboxylic acids which can be used to advantage are iminodiacetic acid, 2 - hydroxyethyliminodiacetic acid, cyclohexanediaminetetraacetic acid, anthranil-N, N-diacetic acid, and 2-picolylamine-N, N-diacetic acid.

The polyphosphoric acids are also good complexing agents for magneisum, and the magnesium salts of these acids are useful in the process of the invention. Exemplary are di-sodium-magnesium pyrophosphate, trisodium-magnesium tripolyphosphate and magnesium polymetaphosphate.

Especially advantageous from the standpoint of cost are the acids naturally present in waste liquors obtained from the alkaline treatment of cellulosic materials, which of course include the waste alkali-oxygen gas bleaching liquor. These acids represent the alkali- or water-soluble degradation products of polysaccharides which are dissolved in such liquors, as well as alkali- or water-soluble degradation products of cellulose and hemicellulose. The chemical nature of these degradation products are complex, and they have not been fully identified. However, it is known that saccharinic and lactic acids are present in such liquors, and that other hydroxy acids are also present. The presence of C₆-isosaccharinic and C₆-metasaccharinic acids has been demonstrated, as well as C₄- and C₅-metasaccharinic acids. Glycolic acid and lactic acid are also probable degradation products derived from the hemicelluloses, together with beta-gamma-dihydroxy butyric acid.

Carbohydrate acid-containing cellulose waste liquors which can be used include the liquors obtained from the hot alkali treatment of cellulose, liquors from sulfite digestion processes, and liquors from sulfate digestion processes, i.e., kraft waste liquor. The waste liquors obtained in alkali-oxygen gas bleaching or pulping processes and alkaline peroxide bleaching processes can also be used. In this instance, the alkaline liquor can be taken out from the process subsequent to completing the oxygen gas treatment stage, or during the actual treatment process.

The complex magnesium salts can be formed first, and then added to the cellulose pulp. They can also be formed in situ, in the waste liquor, for example, from a water-soluble or water-insoluble magnesium salt, oxide or hydroxide, in admixture with the complexing acid, or acid-containing waste liquor, and this mixture can be added to the pulp. Preferably, the waste liquor employed as the source of complexing acid or anhydride or salt thereof can be mixed with a magnesium salt, oxide or hydroxide, before being introduced to the process. It is also possible to add the magnesium salt, oxide or hydroxide to the pulp, and then bring the pulp into contact with the complexing acid or anhydride or salt thereof. It is also possible to combine the complexing acid or anhydride or salt thereof with the pulp, and then add the magnesium salt, oxide or hydroxide, but this method may be less advantageous in practice.

In whatever form the magnesium is added, whether as salt, oxide, hydroxide, or complex salt, the amount of magnesium is calculated as MgO.

A noticeable improvement is obtained when as little magnesium as 0.005% MgO, calculated on the dry weight of the pulp, is added. A high proportion of magnesium, up to 1% MgO, calculated on the dry weight of the pulp, has been employed without disadvantageous effect. However, for economic reasons, it is usually desirable to use as little magnesium as possible, and normally an amount within the range from about 0.01 to about 0.5% MgO, calculated on the dry weight of the pulp, is employed.

Upon conclusion of the alkali-oxygen gas bleaching, the magnesium-containing waste bleaching liquor is recycled for reuse. The consumption of magnesium salts is negligible, and usually it is not even necessary to replenish the magnesium content before recycling. However, additional magnesium compound can be added before recycling, if necessary, to restore the magnesium content, as MgO, and maintain a high enough level, for instance, to prevent oxidative degradation of the cllulose or hemicellulose. The consumption of magnesium salt has been noted to be particularly low when waste liquor from a part of the alkali-oxygen gas treatment process is employed as the source of complexing acid, and recycled for continued treatment of new batches of pulp.

Some waste liquors are particularly high in magnesium ion because of the nature of the pulp or of the pulping process. For example, unbleached pulps produced by the cooking of wood with magnesium bisulfite or magnesium sulfite usually contain enough magnesium ion so that no addition of magnesium compound need be made. Such waste liquors can be used per se, in the process of the invention, inasmuch as they already contain the complexing acids, and a sufficient proportion of magnesium ion as well.

As a source of magnesium, one may add any magnesium salts, oxide or hydroxide, either to regenerate a spent treatment liquor, or to prepare a waste liquor or other material for use in the process. Any water-soluble magnesium compound can be used, such as, for example, magnesium sulfate, magnesium chloride, magnesium bromide, magnesium chlorate, magnesium potassium chloride, magnesium formate, magnesium oxide, magnesium hydroxide, and magnesium nitrate. If it is desired to recover the liquor after the treatment, then it is usually preferable to employ magnesium sulfate, so as to avoid the introduction of corrosive anions into the system. Magnesium compounds which have no deleterious anion or which have an anion which is destroyed in the course of the process, such as magnesium oxide, magnesium hydroxide, and magnesium carbonate, are also advantageous. Since these are water-insoluble, it is desirable, however, to combine these with the complexing agent in the presence of water, and await their dissolution, indicating that the complex has been formed, before combining with the pulp, or before commencing the alkali-oxygen gas reaction. Any other water-insoluble magnesium compounds can be used in this way, for instance, magnesium phosphate, magnesium silicate and magnesium sulfide.

The alkali-oxygen gas bleaching of the pulp is carried out in the normal way. In order to obtain a rapid reaction between the cellulosic material and the oxygen gas or air supplied to the system, the partial pressure of oxygen at the beginning of the treatment should be at least one atmosphere. However, lower pressures can be used, when a slower reaction is acceptable. When using pure oxygen gas, the process can be carried out at pressures approximating atmospheric pressure, while if air is used, because of the lower proportion of oxygen, higher pressures, usually superatmospheric pressures, are employed. If oxygen is used, a practical upper limit is 20 atmospheres, while if air is used, a practical upper limit is 60 atmospheres. The higher the pressure, the more rapid the reaction. Usually, an oxygen gas pressure within the range from about 2 to about 12 atmospheres is preferred.

It is frequently expedient to supply the oxygen gas or air during the process, and to release air enriched with regard to inert gas during the process.

The reaction will proceed at low temperatures, of the order of 25 to 50° C., but then the reaction is slow, and a large reaction vessel is necessary. Consequently, in order to reduce reaction time to a practical range, and keep the equipment small, the treatment is usually carried out at a temperature within the range from about 80 to about 150° C. If it is desired to reduce the viscosity of the pulp, the higher temperatures can be used, of the order of 130 to 140° C. When treating sulfate paper pulps, a lower temperature is used, if a significant reduction of the hemicellulose content is not desired. If a significant reduction of the hemicellulose is desired, however, then it is desirable to employ a rather high temperature. Usually, in the case of sulfate paper pulps, the treatment is carried out advantageously at from 90 to 100° C.

The temperature can be varied upwardly or downwardly, progressively or continuously, during the process. It is in many cases desirable to begin the reaction at a low temperature, and then to gradually increase the temperature during the reaction. This is particularly true in the case of pulps containing hemicellulose which in an unoxidized condition is attacked by alkali, for example, sulfite pulps, and semichemical pulps. Thus, the reaction temperature is low while the hemicellolose remains unoxidized, but as it becomes oxidized, in the course of the reaction, the temperature can be increased, thus reducing the total reaction time.

The concentration of cellulosic material in the reaction mixture can be varied within wide limits, and is in no way critical. Concentrations within the range from about 3 to about 45% are employed. It is, however, preferable to effect the treatment at a concentration in excess of 10%, and preferably within the range from about 15 to about 35%. When high pulp concentrations are treated, the pulp should be shredded mechanically after or at the same time as the reagent chemicals are added to the reaction mixture.

The amount of alkali required in the treatment depends on the quantity of lignin and/or hemicellulose which it is desired to remove. Normally, the alkali charge (calculated as NaOH) is within the range from about 0.5 to about 12% NaOH, based on the weight of the cellulosic material present. Other alkalis can be used, such as potassium hydroxide or lithium hydroxide, in which event the amounts are changed proportionately. If it is desired to dissolve large quantities of lignin and/or hemicellulose during the process, an alkali charge within the range of about 7 to about 12% can be used. When treating a pulp having a low lignin content, in which case a smaller amount of lignin and/or hemicellulose is to be dissolved, the charge can be within the range from about 0.5 to about 7%.

The proportion of hemicellulose dissolved decreases as the amount of alkali is reduced, and accordingly, the amount of both the lignin and the hemicellulose dissolved can be regulated by control of the amount of alkali added.

It may be advantageous to add only a portion of the total quantity of alkali at the beginning of the process, and then add additional alkali as the reaction proceeds. The alkali attacks the lignin preferentially, and by limiting the amount of alkali present at any given time, it is possible to remove the lignin with a minimum of attack upon the cellulose and hemicellulose in the course of the reaction. The desired grade of pulp can thus be controlled by the manner and rate at which the alkali is charged to the system, and the size of the alkali charge, and the reaction time.

The mixing with alkali can be effected at the desired reaction temperature, or at a lower temperature, after which the temperature is increased to reaction temperature.

The reaction time required decreases with an increased oxygen gas pressure and the reaction temperature. If the oxygen gas pressure is high, and the reaction temperature is high, the reaction can be complete in rather a short time, for example, five minutes. When oxygen gas is employed at atmospheric pressure, treatment times of ten hours and more can be used. Normally, however, in a commercial process, where a high rate of production per hour is desirable, the reaction times will be within the range from about 10 to about 120 minutes. The reaction time is easy to control, since the reaction halts when the alkali is consumed, and thus the reaction time can be increased or shortened, depending upon the amount of alkali added at any given time, for a given gas pressure and temperature of reaction.

The pulp treated in accordance with the process of the invention can be further processed in accordance with known methods, as desired. It can, for example, be bleached with chlorine and/or sodium hypochlorite and/or chlorine dioxide, and it may also be subjected to continued refinements, in accordance with known procedures.

In order to lower still further the discharge of organic substances at the conclusion of the process, the cellulose pulp can be washed subsequent to the alkali-oxygen gas bleaching process using an aqueous solution containing an organic substance. A suitable aqueous solution in this respect is one obtained by separating suitably by washing cellulose pulp from waste bleaching liquors and/or extraction liquors from other bleaching stages, and/or extraction stages of the same or another pulp. Examples of such aqueous solutions are those obtained from alkali extraction and hot and cold alkali cellulose treatment processes. Solutions obtained from bleaching cellulose with hydrogen peroxide also can be used for this purpose, as well as bleaching solutions from chlorine, hypochlorite, chlorine dioxide, and chlorite bleaching stages, in any combination. If desired, the chlorine content of the recovery system can be reduced by known methods, for instance, by the absorption of hydrochloric acid from flue gases obtained when burning waste liquor, or by crystallizing out sodium chloride. The aqueous solution containing the organic substance can also be an evaporation condensate, which is optionally pre-treated in a known manner to remove volatile and/or colored materials.

In accordance with another embodiment of the invention, the aqueous solution containing organic substances or a portion of this solution is pretreated before being used to wash the cellulose pulp subsequent to bleaching the same with an oxygen-containing gas. The pretreatment process is preferably in the form of an oxidation process, suitably with an oxygen-containing gas. Other convenient pretreatment methods include biological purification using an activated sludge or a biological bed and/or treatment with lime and/or alkali, filtering, separation by means of membranes, for example, reverse osmosis or ultrafiltration, treatment with activated carbon or treatment with polymers having absorbing and/or ion-exchanging properties, or with inorganic ion exchanges.

The following examples, in the opinion of the inventors, represent preferred embodiments of their invention:

EXAMPLES 1 TO 4

Unbleached pine sulfate cellulose, straight from the digester without prior screening, was pressed to remove the main portion of the black liquor from the pulp. Part of the remaining black liquor was then displaced from the pulp with waste bleaching liquor obtained during the alkali-oxygen gas bleaching of such pine sulfate pulp. The alkali-oxygen gas bleaching process was carried out at 100° C., and an oxygen gas pressure of 8 bars, for 30 minutes, at a pulp concentration of 30%. The alkali-oxygen gas bleaching utilized recirculated waste bleaching liquor, to which magnesium sulfate had been added in order to form magnesium complexes with the saccharinic acids present in the waste bleaching liquor. The waste bleaching liquor was recovered by displacement with water passed in countercurrent flow to the pulp on filters, combined with pressing the pulp to a pulp concentration of 40%.

The quantity of magnesium present during the alkali-oxygen gas bleaching was about 0.2%, calculated as MgO on the weight of the dry pulp. The quantity of alkali charged during the alkali-oxygen gas bleaching was 3% sodium hydroxide by weight of the dry pulp.

The partial displacement of the black liquor was effected by treating the pulp with waste alkali-oxygen gas bleaching liquor, so that the amount of remaining organic black liquor substances was varied in the manner shown in Table I. The amount of organic substances present in the spent cooking liquor was calculated in kilograms per 100 kilograms of dry pulp charged to the process. The Kappa number and brightness were determined according to SCAN. The viscosity is given as the intrinsic viscosity, and was determined in copper ethylene diamine, according to SCAN. For comparison purposes, a Control was run in which the black liquor was carefully removed completely by washing the pulp with water. The following results were obtained:

TABLE I

| | Organic spent cooking liquor substances (kg./100 kg. pulp)) | Kappa number | Viscosity | Brightness |
|---|---|---|---|---|
| Unbleached pulp | | 31.1 | 1,126 | |
| Control | 0 | 19.6 | 1,035 | 34.5 |
| Example number: | | | | |
| 1 | 5 | 15.9 | 969 | 38.9 |
| 2 | 10 | 18.6 | 968 | 36.0 |
| 3 | 15 | 20.5 | 969 | 34.1 |
| 4 | 18 | 20.4 | 942 | 33.7 |

The test results show that the brightness of the pulp is surprisingly improved, and that the Kappa number falls, when the alkali-oxygen gas bleaching is carried out in the presence of significant amounts of black liquor. Furthermore, the properties of the pulp are not deleteriously affected even when the quantity of organic substances from the waste liquor is as high at 18%, which means that the process of the invention is particularly effective and economical from the standpoint of utilizing the chemicals in waste cooking liquor, as well as in waste alkali-oxygen gas bleaching liquor.

EXAMPLE 5

The same pine sulfate pulp used in Examples 1 to 4 was pressed in a screw press without prior removal of the waste cooking liquor (black liquor) to a pulp concentration of approximately 45%. Without subjecting the pulp to a subsequent washing treatment, waste alkali-oxygen gas bleaching liquor from bleaching pine sulfate pulp was mixed with the pulp in a peg shredder, the waste bleaching liquor being enriched with respect to organic substances by returning the same to the oxygen gas bleaching stage, so that the content of dry solids was 5.5%. Magnesium sulfate and sodium hydroxide also were added, so that the charge based on the dry pulp had the same contents of magnesium and alkali as in Examples 1 to 4. The quantity of waste alkali-oxygen gas bleaching liquor was adjusted so that the pulp concentration subsequent to mixing the waste bleaching liquor with the pulp in the shredder was 30%.

The pine sulfate pulp was then bleached with oxygen gas at a pulp concentration of 30% at 100° C. and an oxygen gas pressure of 8 bars for 30 minutes. The quantity of organic waste cooking liquor substances in this case was 24%. The bleached pulp had a Kappa number of 22.7, a viscosity of 923, and a brightness of 31%, according to SCAN. The properties of the bleached pulp aproximated those of the pulp of Examples 1 to 4, with only a slight deterioration, which was compensated for by the technical advantage that it was not necessary to displace any black liquor prior to the alkali-oxygen gas bleaching.

EXAMPLES 6 TO 8

One portion of pine sulfate pulp having a high Kappa number was screened in the presence of black liquor, and then pressed to remove the main portion of the black liquor from the pulp. Another portion of the same pulp was not screened. Part of the remaining black liquor was then displaced from both screened and unscreened pulps with waste alkali-oxygen gas bleaching liquor. The alkali-oxygen gas bleaching process was then carried out on the screened and unscreened pulps at 100° C. and an oxygen gas pressure of 8 bars for 30 minutes at a pulp concentration of 30%, using waste alkali-oxygen gas bleaching liquor recirculated from bleaching pine sulfate pulp, to which magnesium sulfate had been added. The quantity of magnesium present was 0.2%, calculated mainly as MgO, in the form of complex magnesium salts of the saccharinic acids present in the waste bleaching liquor. The quantity of alkali charged during the oxygen gas bleaching process was 3% sodium hydroxide, based on the weight of the dry pulp.

The partial displacement of the black liquor by waste bleaching liquor was effected by treating the pulp with waste alkali-oxygen gas bleaching liquor such that the amount of the organic black liquor substances remaining in the pulp was varied in the manner shown in Table II. For comparison purposes, a Control was run using both screened and unscreened pulps in which all of the black liquor was displaced. The results of the experiments are shown in Table II.

The results of these tests confirm that the brightness is improved when the alkali-oxygen gas bleaching is effected in the presence of black liquor, and show that the differences in Kappa number, viscosity and brightness when bleaching screened or unscreened pulp are negligible.

The unscreened pulp was bleached with a mixture of chlorine and chlorine dioxide, in the stage immediately following the oxygen gas bleaching, after which an alkali extraction was carried out, and the pulp was then finally bleached in a conventional manner with chlorine dioxide. Pulp brightness according to SCAN was 90%. The pulp brightness in parallel tests with screened pulp was 91%.

EXAMPLES 9 TO 14

Spruce sulfite pulp which had been subjected to a two-stage cooking process using sodium as a base, was removed from the digester and pressed without prior screening to remove the main portion of the waste sulfite liquor from the pulp. Part of the remaining waste liquor was then displaced from the pulp with waste bleaching liquor obtained by the alkali-oxygen gas bleaching of this sulfite pulp. The alkali-oxygen gas bleaching was carried out at 100° C. and an oxygen gas pressure of 8 bars for 30 minutes at a pulp concentration of 30%, using recirculated waste alkali-oxygen gas bleaching liquor, to which magnesium sulfate had been added to form magnesium complexes with the acids of the waste bleaching liquor. The waste bleaching liquor was recovered by displacement with water passed in countercurrent flow with respect to the pulp, on filters, combined with pressing the pulp to a pulp concentration of 40%. The quantity of magnesium present during the alkali-oxygen gas bleaching was 0.2%, calculated as MgO, based on the weight of the dry pulp. The amount of alkali charged during the alkali-oxygen gas bleaching was 4% sodium hydroxide, based on the weight of the dry pulp. The partial displacement of the waste sulfite liquor was effected by treating the pulp with waste alkali-oxygen gas bleaching liquor so that the amount of remaining sulfite waste liquor substances was varied in the manner shown in Table III. For comparison purposes, a Control was run in which all of the waste sulfite liquor was displaced from the pulp by washing with water. The following results were obtained:

TABLE III

|  | Organic spent cooking liquor substance kg./100 kg. pulp) | Kappa number | Viscosity |
|---|---|---|---|
| Unbleached sulfite pulp | | 18.3 | 1,210 |
| Control | 0 | 8.0 | 1,109 |
| Example number: | | | |
| 9 | 2 | 7.4 | 1,116 |
| 10 | 3.5 | 8.3 | 1,111 |
| 11 | 8 | 9.5 | 1,117 |
| 12 | 11 | 10.6 | 1,147 |
| 13 | 19 | 11.7 | 1,166 |
| 14 | 26 | 13.2 | 1,170 |

The alakli charge was 4 kg. of NaOH, based on 100 kilograms of dry unbleached pulp, even in those cases when sulfite waste liquor was present.

It is apparent from the results that a lower Kappa number was obtained in the presence of a moderate amount of spent sulfite liquor. The Kappa number increases with increasing amounts of waste sulfite liquor, which is explained by the fact that the waste sulfite liquor consumes alkali. This disadvantage is offset by a moderate

TABLE II

| | Organic cooking waste liquor substance (kg./100 kg. pulp) | Kappa number | | Viscosity | | Brightness | |
|---|---|---|---|---|---|---|---|
| | | Unscreened pulp | Screened pulp | Unscreened pulp | Screened pulp | Unscreened pulp | Screened pulp |
| Unbleached pulp | | 40.1 | 40.1 | 1,227 | 1,221 | | |
| Control | 0 | 22.6 | 22.4 | 1,079 | 1,058 | 31.4 | 31.6 |
| Example number: | | | | | | | |
| 6 | 5 | 22.5 | 22.4 | 1,020 | 1,040 | 33.9 | 34.6 |
| 7 | 10 | 22.3 | 21.9 | 984 | 1,019 | 33.9 | 34.1 |
| 8 | 15 | 22.0 | 23.7 | 963 | 992 | 31.4 | 32.7 | increase in the alkali charge, for example, by introducing sodium hydroxide, sodium carbonate, and/or sodium bicarbonate to the system. The additional costs incurred by doing this are more than compensated for by the improved and simplified recovery of waste sulfite liquor.

EXAMPLES 15 AND 16

The black liquor was displaced partially from a pine sulfate pulp by washing with water. After pressing to a pulp consistency of 42%, the pulp contained 5 kg. of black liquor substance calculated per 100 kg. of dry pulp. The alkali-oxygen gas bleaching was then carried out at 100° C. at an oxygen gas pressure of 8 bars for 30 minutes at a pulp concentration of 30%, using recirculated waste alkali-oxygen gas bleaching liquor to which magnesium sulfate had been added in order to form magnesium complexes with the saccharinic acids present in the liquor. The quantity of magnesium present during the alkali oxygen gas bleaching was 0.2%, calculated as MgO, based on the dry weight of the pulp. As the alkali charge, there was used sodium hydroxide in combination with a solution of sodium sulfate and sodium hydroxide (white liquor), having the composition: effective alkali 105 grams per liter, active alkali 130 grams per liter, sodium sulfide 52 grams per liter. The quantity of alkali charged is given in Table IV. For comparison purposes, Control 1 and Example 15 were run using pure sodium hydroxide as the alkali, and Control 2 and Example 16 were run using the mixture of sodium hydroxide and sodium sulfide described. The following results were obtained:

TABLE IV

| | Effective alkali (percent NaOH) | Organic substance from cooking liquor (kg./100 kg. pulp) | Kappa number | Viscosity | Brightness |
|---|---|---|---|---|---|
| Unbleached pulp | | | 37.0 | 1,190 | |
| Control: | | | | | |
| 1 | 2.8 | | 17.9 | 1,086 | 38.5 |
| 2 | 2.4 | | 15.8 | 1,034 | 41.8 |
| Example number: | | | | | |
| 15 | 2.6 | 5 | 16.0 | 1,045 | 41.2 |
| 16 | 2.3 | 5 | 14.5 | 997 | 42.5 |

Thus, by carrying out the alkali-oxygen gas bleaching with a mixture of sodium hydroxide and sodium sulfide as the alkali, an addition of black liquor gives both a lower Kappa number and a higher brightness.

We claim:

1. In the bleaching of sulfate cellulose pulp by the alkali-oxygen gas process, in which a gas containing oxygen is introduced into the pulp in the presence of alkali, the improvement which comprises first impregnating the sulfate cellulose pulp containing spent pulping liquor and organic substances thereof in an amount within the range from about 1 to about 35 parts sulfate waste liquor organic substances per 100 parts dry unbleached sulfate cellulose pulp with waste bleaching liquor from the alkali-oxygen gas bleaching process, and then bleaching the sulfate cellulose pulp impregnated with the waste alkali-oxygen gas bleaching liquor and spent pulping liquor by treatment with alkali in the presence of oxygen at a partial pressure of oxygen of at least about one bar, and at a temperature within the range from about 25° to about 150° C.

2. A process in accordance with claim 1, in which the waste bleaching liquor is introduced into the pulp by washing the spent pulping liquor partialy from the pulp with waste bleaching liquor.

3. A process in accordance with claim 1, in which the pulp is saturated with spent pulping liquor from the pulping operation and part of the spent pulping liquor is separated from the pulp before impregnation with the waste bleaching liquor.

4. A process in accordance with claim 3, in which the spent pulping liquor is removed by pressing the pulp.

5. A process in accordance with claim 3, in which part of the spent pulping liquor is removed by washing the pulp with water.

6. A process in accordance with claim 1, in which the waste alkali-oxygen gas bleaching liquor is recycled within the pulp alkali-oxygen gas bleaching process in a cyclic or continuous operation.

7. A process in accordance with claim 1, in which the waste alkali-oxygen gas bleaching liquor is the alkaline liquor remaining in the bleaching system upon completion of the alkali-oxygen gas bleaching process, after separation of the pulp therefrom.

8. A process in accordance with claim 1, in which the waste alkali-oxygen gas bleaching liquor is an aqueous solution obtained by washing out the contents of the bleaching system with water or a mixture of water and liquid obtained from the bleaching process.

9. A process in accordance with claim 1, in which the cellulose pulp is a sulfate pulp impregnated with the waste alkali-oxygen gas bleaching liquor and spent sulfate pulping liquor and is bleached by treatment with alkali in the presence of oxygen at a partial pressure of oxygen of at least about one bar and a temperature within the range from about 90° to about 100°.

10. A process in accordance with claim 1, in which the cellulose pulp is unscreened.

11. A process in accordance with claim 1, in which cellulose pulp is de-knotted before bleaching.

12. A process in accordance with claim 1, in which a magnesium compound which protects the cellulose against degradation is present during the alkali-oxygen gas bleaching process.

13. A process in accordance with claim 1 in which the spent cooking liquor is subjected to a preoxidation with an oxygen-containing gas and then used to replace a part of the spent cooking liquor in the cellulose pulp prior to oxygen bleaching.

14. A process in accordance with claim 13, in which part of the spent cooking liquor is displaced from the pulp with oxidized spent cooking liquor or a mixture of oxidized spent cooking liquor and waste alkali-oxygen gas bleaching liquor, and part of the resulting liquid remaining in the pulp is displaced therefrom with waste alkali-oxygen gas bleaching liquor.

15. A process in accordance with claim 1, in which waste alkali-oxygen gas bleaching liquor is recovered from the alkali-oxygen gas bleaching stage under pressure, and is used to partially wash out spent cooking liquor from the cellulose pulp under superatmospheric pressure.

16. A process in accordance with claim 1, in which subsequent to the alkali-oxygen gas bleaching process the cellulose pulp is washed with an aqueous solution selected from the group consisting of aqueous solutions containing organic substances obtained in separating waste alkali-oxygen gas bleaching liquors; spent liquors from cellulose pulp in other pulp bleaching stages and spent liquors from cellulose pulp in pulp extraction stages.

17. A process in accordance with claim 16, in which at least a part of the organic substance-containing aqueous solution, before the solution is used for washing the cellulose pulp after the alkali-oxygen gas bleaching process, is subjected to an oxidation process with an oxygen-containing gas.

18. In the bleaching of sulfite cellulose pulp by the alkali-oxygen gas process, in which a gas containing oxygen is introduced into the pulp in the presence of alkali, the improvement which comprises first impregnating the sulfite cellulose pulp containing spent pulping liquor and organic substances thereof in an amount within the range from about 1 to about 30 parts sulfite waste liquor organic substances per 100 parts dry unbleached sulfite cellulose pulp with waste bleaching liquor from the alkali-oxygen gas bleaching process, and then bleaching the sulfite cellulose pulp impregnated with the waste alkali-oxygen gas bleaching liquor and spent pulping liquor by treatment with alkali in the presence of oxygen at a partial pressure of oxygen of at least about one bar, and at a temperature within the range from about 25° to about 150° C.

19. A process in accordance with claim 18, in which the waste bleaching liquor is introduced into the pulp by washing the spent pulping liquor partially from the pulp.

20. A process in accordance with claim 18, in which part of the spent pulping liquor is separated from the pulp before impregnation with the waste bleaching liquor.

21. A process in accordance with claim 18, in which the waste alkali-oxygen gas bleaching liquor is recycled within the pulp alkali-oxygen gas bleaching process in a cyclic or continuous operation.

22. A process in accordance with claim 18, in which the waste alkali-oxygen gas bleaching liquor is the alkaline liquor remaining in the bleaching system upon completion of the alkali-oxygen gas bleaching process, after separation of the pulp therefrom.

23. A process in accordance with claim 18, in which the cellulose pulp impregnated with the waste alkali-oxygen gas bleaching liquor and spent pulping liquor is bleached by treatment with alkali in the presence of oxygen at a partial pressure of oxygen of at least about one bar, and a temperature within the range from about 50° to about 140° C.

24. A process in accordance with claim 18, in which a magnesium compound which protects the cellulose against degradation is present during the alkali-oxygen gas bleaching process.

References Cited

UNITED STATES PATENTS

| | | | |
|---|---|---|---|
| 3,384,533 | 5/1968 | Robert et al. | 162—65 |
| 1,768,821 | 7/1930 | Bradley et al. | 162—88 |
| 1,768,822 | 7/1930 | Bradley et al. | 162—88 X |
| 1,768,823 | 7/1930 | Bradley et al. | 162—88 X |
| 3,294,624 | 12/1966 | Sloman | 162—88 X |
| 3,654,070 | 4/1972 | Pradt et al. | 162—65 X |
| 1,864,220 | 6/1932 | Ruff | 162—88 X |
| 2,031,485 | 2/1936 | John et al. | 162—88 X |
| 3,525,665 | 8/1970 | Gessner | 162—65 X |
| 2,041,666 | 5/1936 | Richter | 162—88 X |

OTHER REFERENCES

Casey, Pulp and Paper, 2d ed., vol. I, p. 265 (Gr. 173).
Casey, Pulp and Paper, 2d ed., vol. I, pp. 123–24 (Gr. 173).

S. LEON BASHORE, Primary Examiner
A. L. CORBIN, Assistant Examiner

U.S. Cl. X.R.
8—111; 162—65

UNITED STATES PATENT OFFICE
CERTIFICATE OF CORRECTION

Patent No. 3,759,783  Dated September 18, 1973

Inventor(s) Hans Olof Samuelson et al

It is certified that error appears in the above-identified patent and that said Letters Patent are hereby corrected as shown below:

Column 6, line 29 : "many" should be --may--

Column 6, line 31 : "peroxidation" should be --preoxidation--

Column 6, line 65 : "pressure" should be --pressures--

Column 7, line 63 : "acid" should be --acids--

Column 7, line 75 : delete the period (.) before "about"

Column 8, line 6 : "acid, ribonic acid, xylonic acid, lyxonic acid, gulonic acid" should be --acid, α-hydroxy-n-valeric acid, α-hydroxy-isovaleric acid--

Column 8, line 31 : " $\begin{array}{c}\text{HOOCCH}_2\\\text{HOOCCH}_2\end{array}\!\!\!>\!\!\text{N-}\!\!\left(\text{C}_2\text{H}_4\text{N}\atop 1\right)_{\!n}\!\!\text{CH}_2\text{COOH}$ " should be
--$\begin{array}{c}\text{HOOCCH}_2\\\text{HOOCCH}_2\end{array}\!\!\!>\!\!\text{N-}\!\!\left(\text{C}_2\text{H}_4\text{N}\atop A\right)_{\!n}\!\!\text{CH}_2\text{COOH}$ --

Signed and sealed this 14th day of May 1974.

(SEAL)
Attest:

EDWARD M. FLETCHER, JR.
Attesting Officer

C. MARSHALL DANN
Commissioner of Patents